No printed specification available
6802X
J. Stanford,
Making Glassware.
Patented Oct. 17, 1831.
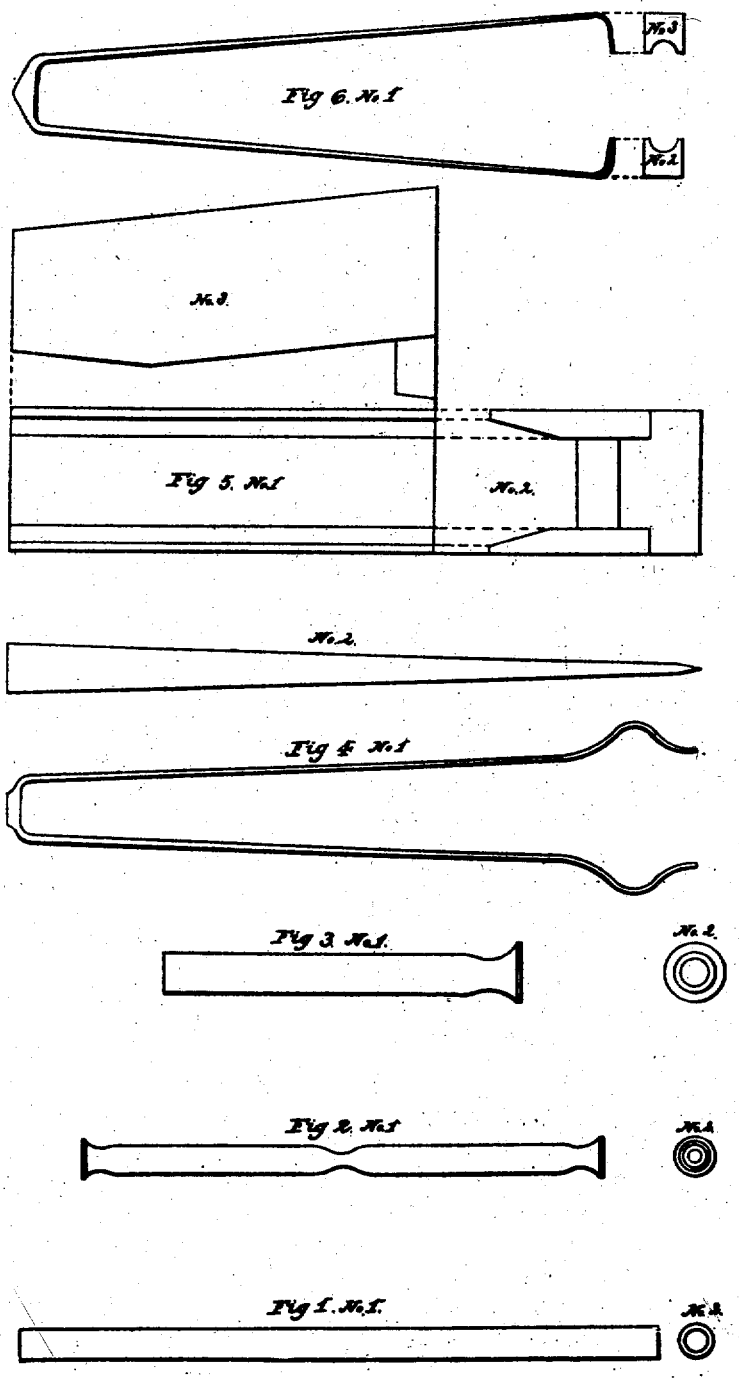

John Staniford of Boston Mass.

Letters Patent

The Schedule referred to in these Letters Patent and making part of the same containing a description in the words of the said John Staniford himself of his improvement in the mode of manufacturing Essence Phials called the "tubular improvement

---

To all to whom these presents shall come. I John Staniford of the City of Boston, in the County of Suffolk and Commonwealth of Massachusetts, Glass Blower send Greeting.

Be it known that I the said John Staniford have invented, constructed made and applied to use, a new and useful improvement in the mode of making or manufacturing Glass Essence Phials, called the "Tubular improvement", specified in the words and figures following.

The mode of making essence phials before the present improvement, and now generally in use is by taking the metal in a fluid state upon an iron pipe and blowing and forming as is usual in making Phials and bottles of a larger size, to do which a punty or second rod is necessary with fluid glass upon it which leaves the bottom rough when it is knocked off, and there is wasted about one half the metal, the phials also, are left rough, ill shapen unequal and imperfect from the impossibility of working so small a parcel of metal before it will cool. The improvement is as follows. I make the essence Phials from glass tubes prepared for the purpose, of the size desired, I cut them into lengths sufficient for two Phials, then I work them by a large lamp and bellows blowpipe. I form the brims at the ends of the tube with a pair of pincers and the necks with another pair of pincers, both of which pincers were his made and applied to this manufacture by me. The brims and necks are made by applying the Pincers while the tube is heated in the lamp and by rolling the tube on a shifting inclined plane or form provided for the hand to 196 6802X move on and placed, near the lamp: the lower end next the opera
tor - this plane having been first made and applied to this use by
me - I then apply the heat to the middle of the tube and divide
it, making the two bottoms by the same heat, and nearly at the same
instant - the bottoms being made last are rendered perfectly smooth,
(there being no fanty used) by the sample application of an iron
to the part while heated. Another great advantage of this
improvement is, that the Phials can be made much smaller, of
uniform size, smooth straight, and beautiful, and the waste
of metal instead of being one half, is only about one in twen-
ty - And this new article can be supplied in any quantity de-
sired with great rapidity, and at a rate at least as low
as the old and imperfect kind can be either imported from
Europe or manufactured in this Country.

The drawings & references herewith exhibit - Fig 1. No 1. the
Glass tube as prepared for two Phials of a drachm each.
No 2. The end of the Tube. - Fig 2. No 1. a tube with brims
and necks formed and the formation of the bottoms commenced
for two Phials of half drachm each. No 2. the end or brim.
Fig 3. No 1. is a Phial in the finished state, of two drachms.
No 2. the brim of the same. Fig 4 No. 1. is an open view of
the pincers to form brims. No 2. is a side view of the same.

Fig 5. No. 1. steop view of the inclined plane or form
half size. No 2. Highest end of plane or form half size.
No 3. side view of Plane or form half size - Fig 6. No 1. pincers
for forming the necks. No 2. & 3. End views of same.

In testimony that the above is a true Specification of my said
Improvement as above described. I have hereto set my hand &
seal this seventh day of September in the year of our Lord
Eighteen Hundred and thirty one Witnesses { William [illegible]
{ [illegible]

John [illegible].

(Recorded [illegible] Oct. 1831)

([illegible])